United States Patent
Hsiao et al.

(10) Patent No.: US 12,308,147 B2
(45) Date of Patent: May 20, 2025

(54) THERMISTOR PASTE AND MANUFACTURING METHOD THEREOF

(71) Applicant: YAGEO CORPORATION, Kaohsiung (TW)

(72) Inventors: Shen-Li Hsiao, Kaohsiung (TW); Kuang-Cheng Lin, Kaohsiung (TW); Wei-Chen Huang, Kaohsiung (TW); Ren-Hong Wang, Kaohsiung (TW)

(73) Assignee: YAGEO CORPORATION, Kaohsiung (TW)

( * ) Notice: Subject to any disclaimer, the term of this patent is extended or adjusted under 35 U.S.C. 154(b) by 0 days.

(21) Appl. No.: 18/520,190

(22) Filed: Nov. 27, 2023

(65) Prior Publication Data
US 2025/0054662 A1  Feb. 13, 2025

(30) Foreign Application Priority Data
Aug. 9, 2023 (TW) ................. 112129917

(51) Int. Cl.
| | | |
|---|---|---|
| *H01C 7/04* | (2006.01) | |
| *C04B 35/01* | (2006.01) | |
| *C04B 35/626* | (2006.01) | |
| *C04B 35/634* | (2006.01) | |
| *C04B 35/636* | (2006.01) | |
| *C04B 35/64* | (2006.01) | |

(52) U.S. Cl.
CPC .......... *H01C 7/049* (2013.01); *C04B 35/016* (2013.01); *C04B 35/6262* (2013.01); *C04B 35/6264* (2013.01); *C04B 35/6342* (2013.01); *C04B 35/63424* (2013.01); *C04B 35/63492* (2013.01); *C04B 35/6365* (2013.01); *C04B 35/64* (2013.01); *C04B 2235/3263* (2013.01); *C04B 2235/3277* (2013.01); *C04B 2235/3279* (2013.01); *C04B 2235/365* (2013.01); *C04B 2235/5436* (2013.01); *C04B 2235/6567* (2013.01)

(58) Field of Classification Search
CPC ...................................................... H01C 7/049
See application file for complete search history.

(56) References Cited

U.S. PATENT DOCUMENTS

| | | | |
|---|---|---|---|
| 4,587,040 A * | 5/1986 | Tosaki | H01C 7/043 252/521.2 |
| 5,122,302 A | 6/1992 | Hormadaly | |
| 6,063,311 A | 5/2000 | Takeuchi et al. | |

(Continued)

FOREIGN PATENT DOCUMENTS

| | | |
|---|---|---|
| CN | 1405798 A | 3/2003 |
| CN | 107068311 | 8/2017 |

(Continued)

*Primary Examiner* — William D Young
(74) *Attorney, Agent, or Firm* — CKC & Partners Co., LLC

(57) ABSTRACT

The present invention relates to a thermistor paste and a manufacturing method thereof. The thermistor paste includes specific contents of thermistor powder, a glass powder, and an organic carrier, in which the organic carrier includes an organic solvent, a binder, and an additive. A thermistor semi-finished product slurry of the present invention has been sintered. The thermistor paste of the present invention excludes a precious metal, such as ruthenium, gold, or platinum, etc., so the production cost can be reduced.

9 Claims, 1 Drawing Sheet

(56) References Cited

U.S. PATENT DOCUMENTS

| | | |
|---|---|---|
| 6,649,524 B2 | 11/2003 | Watanabe |
| 2019/0331536 A1 | 10/2019 | Hioki et al. |

FOREIGN PATENT DOCUMENTS

| | | |
|---|---|---|
| CN | 112271048 | 1/2021 |
| CN | 112390640 A | 2/2021 |
| CN | 112489906 A | 3/2021 |
| CN | 113200735 A | 8/2021 |
| DE | 1590868 A1 | 4/1970 |
| EP | 3901115 A1 | 10/2021 |
| JP | 2001-261450 A | 9/2001 |
| JP | 2004-31795 A | 1/2004 |
| TW | 202311447 | 3/2023 |

\* cited by examiner

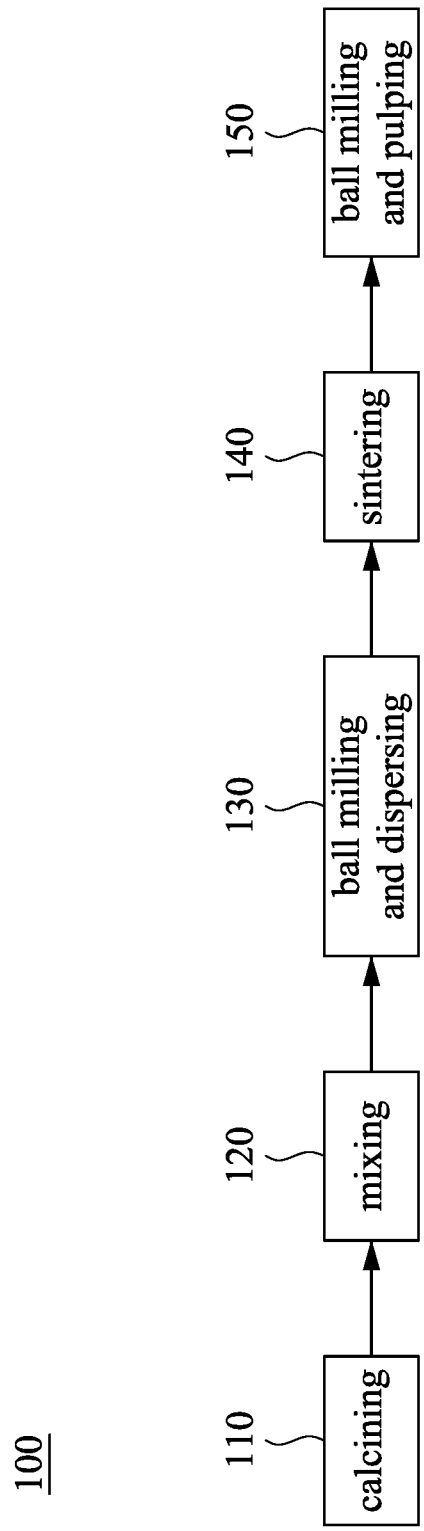

THERMISTOR PASTE AND MANUFACTURING METHOD THEREOF

RELATED APPLICATION

This application claims priority to Taiwan Application Serial Number 112129917, filed Aug. 9, 2023, which is herein incorporated by reference.

BACKGROUND

Field of Invention

The present invention relates to a thermistor paste and a manufacturing method thereof. More particularly, the present disclosure relates to a thick-film thermistor paste obtained by mixing a thermistor semi-finished product slurry, glass powder and an organic carrier.

Description of Related Art

In the field of thermistor, a thermistor crystal can be formed by laminating or co-firing with silver electrodes. However, laminate sintering often causes problems of sintering shrinkage and lamination separation. The resulting product has an inferior mechanical structural strength, which is disadvantageous to bending or vibration of the circuit board.

Currently, a thermistor paste formed by thick film printing is known, which is formed by mixing powder, ruthenium oxide, glass powder, and a colloid, etc. However, ruthenium is a precious metal, so the production cost is high. In addition, the above thermistor paste has the problems of paste dispersion and electrical stability.

For the foregoing reasons, there is a need to solve the above-mentioned problems by providing a thermistor paste and a manufacturing method thereof.

SUMMARY

The present invention provides a thermistor paste and a manufacturing method thereof. The thermistor paste of the present invention is obtained by mixing the thermistor semi-finished product slurry and the glass powder and the organic carrier. The thermistor semi-finished product slurry has been sintered, so it has relatively uniform electrical properties and better electrical stability. The thermistor paste of the present invention excludes a precious metal, such as ruthenium, gold, or platinum, etc., so the production cost can be reduced. Additionally, the thermistor paste of the present invention can be applied by utilizing thick film printing to quickly produce thermal interrupter chips.

A thermistor paste is provided. Based on a total weight of the thermistor paste as 100 weight percent, the thermistor paste includes 50 to 89 weight percent of a thermistor powder, 1 to 5 weight percent of a glass powder, and 10 to 45 weight percent of an organic carrier. A main component of the thermistor powder is $Mn_xCo_{1-x}Ni_yO_{1.6}$, x is from 0.4 to 1.0, and y is from 0.07 to 0.75. Based on a total weight of the organic carrier as 100 weight percent, the organic carrier includes 80 to 92 weight percent of an organic solvent, 5 to 15 weight percent of a binder, and 3 to 5 weight percent of an additive. An average grinding fineness of the thermistor paste is smaller than 20 μm.

In some embodiments, based on a total weight of the glass powder as 100 weight percent, the glass powder includes 20 to 50 weight percent of bismuth trioxide ($Bi_2O_3$), 10 to 30 weight percent of silicon dioxide ($SiO_2$), 5 to 30 weight percent of boron oxide ($B_2O_3$), 5 to 10 weight percent of titanium dioxide ($TiO_2$), 5 to 20 weight percent of aluminum oxide ($Al_2O_3$), 5 to 20 weight percent of zinc oxide (ZnO), and 5 to 20 weight percent of vanadium pentoxide ($V_2O_5$).

In some embodiments, the organic solvent is selected from the group consisting of ethylene glycol monoethyl ether acetate, ethylene glycol monobutyl ether acetate, hexanol, terpineol, benzyl alcohol, and petroleum hydrocarbon.

In some embodiments, the organic solvent excludes methanol and ethanol.

In some embodiments, the binder is selected from the group consisting of ethyl cellulose, methyl cellulose, rosin resin, polymethacrylamide, and polyvinyl butyral.

In some embodiments, the additive is selected from the group consisting of lecithin, oleic acid, stearic acid, fatty acid, erucamide, oleamide, stearamide, polyacrylamide, and N,N-ethylene bis-stearamide.

In some embodiments, the additive includes a dispersant and/or a levelling agent.

In some embodiments, a viscosity of the thermistor paste is from 5 Pa·s to 300 Pa·s.

In some embodiments, the viscosity of the thermistor paste is from 50 Pa·s to 280 Pa·s.

The present invention provides a manufacturing method of a thermistor paste including the following operations: providing a thermistor semi-finished product slurry; providing a glass powder; providing an organic carrier, in which the organic carrier includes an organic solvent, a binder, and an additive; mixing the thermistor semi-finished product slurry, the glass powder, and the organic carrier to obtain a thermistor semi-finished product slurry mixture, in which based on a total weight of the thermistor semi-finished product slurry mixture as 100 weight percent, the thermistor semi-finished product slurry mixture includes 40 to 70 weight percent of the thermistor semi-finished product slurry, 1 to 5 weight percent of the glass powder, 10 to 40 weight percent of the organic solvent, 5 to 15 weight percent of the binder, and 0.5 to 5 weight percent of the additive; using three rollers to roll the thermistor semi-finished product slurry mixture; and filtering the thermistor semi-finished product slurry mixture after using the three rollers to roll the thermistor semi-finished product slurry mixture, so as to obtain the thermistor paste.

In some embodiments, forming the thermistor semi-finished product slurry includes the following operations: providing a thermistor sintered material; mixing the thermistor sintered material, terpineol, and oleamide to obtain a thermistor sintered material mixture, in which based on a total weight of the thermistor sintered material mixture as 100 weight percent, the thermistor sintered material mixture includes 40 to 60 weight percent of the thermistor sintered material, 40 to 55 weight percent of terpineol, and 0.5 to 5 weight percent of oleamide; and ball milling the thermistor sintered material mixture to obtain the thermistor semi-finished product slurry.

In some embodiments, the thermistor sintered material is obtained by sintering a ball-milled mixture, wherein based on a total weight of the ball-milled mixture as 100 weight percent, the ball-milled mixture includes 40 to 60 weight percent of a NTC thermistor mixture, 39.5 to 55 weight percent of a mixture of 95% toluene and 5% alcohol, and 0.5 to 5 weight percent of oleic acid.

In some embodiments, the NTC thermistor mixture is obtained by mixing elemental powders, and the elemental powders comprise manganese tetroxide ($Mn_3O_4$), cobalt tetroxide ($Co_3O_4$), and nickel trioxide ($Ni_2O_3$).

In some embodiments, the elemental powders are calcined at 600° C. to 950° C. for 1 to 4 hours.

In some embodiments, a sintering temperature of the thermistor paste is from 650° C. to 1100° C.

BRIEF DESCRIPTION OF THE DRAWINGS

Aspects of the present disclosure are best understood from the following detailed description when read with the accompanying figures.

FIG. 1 depicts a flowchart of a manufacturing method of a thermistor paste according to some embodiments of the present disclosure.

DETAILED DESCRIPTION

The making and using of the embodiments of the present invention are discussed in detail below. It should be appreciated, however, that the embodiments of the present disclosure provide many applicable inventive concepts that can be embodied in a wide variety of specific contexts. The specific embodiments discussed are merely illustrative of specific ways to make and use the disclosure, and do not limit the scope of the present invention.

In the present specification, a range represented by "one value to another value" is a summary representation that avoids enumerating all the values in the range in the specification. Therefore, the recitation of a particular numerical range covers any numerical value within the numerical range and the smaller numerical range defined by any numerical values within the numerical range, as if the arbitrary value and the smaller numerical range are expressly stated in the specification. As used herein, the term "and/or" includes any and all combinations of one or more of the associated listed items.

In addition, while the method according to the present disclosure is illustrated and described below as a series of operations or steps, it will be appreciated that the illustrated ordering of such operations or steps are not to be interpreted in a limiting sense. For example, some operations or steps may occur in different orders and/or concurrently with other steps apart from those illustrated and/or described herein. Additionally, not all illustrated operations, steps and/or features can be required to implement one or more aspects or embodiments described herein. Also, each of the operations or steps disclosed herein may include several sub-steps or actions.

The present invention provides a thermistor paste obtained by using a thermistor semi-finished product slurry (also called a negative temperature coefficient (NTC) thermistor semi-finished product slurry) and glass powder and an organic carrier. The thermistor semi-finished product slurry is obtained by using a flowchart 100 shown in FIG. 1.

Reference is made to FIG. 1. First, elemental powders are calcined at 600° C. to 950° C. for 1 to 4 hours, as shown in block 110. The elemental powders include manganese tetroxide ($Mn_3O_4$), cobalt tetroxide ($Co_3O_4$), and nickel trioxide ($Ni_2O_3$).

Then, the above elemental powders are uniformly mixed to obtain an NTC thermistor mixture, as shown in block 120. In some embodiments, based on a total weight of the NTC thermistor mixture as 100 weight percent, the NTC thermistor mixture may, for example, include 30 to 45 weight percent (wt %) of $Mn_3O_4$, 25 to 35 weight percent of $Co_3O_4$, and 30 to 43 weight percent of $Ni_2O_3$.

In other embodiments, in addition to the above three elemental powders, the NTC thermistor mixture may further be added with an additive. In these embodiments, based on the total weight of the NTC thermistor mixture as 100 weight percent, the NTC thermistor mixture includes 30 to 45 weight percent of $Mn_3O_4$, 25 to 35 weight percent of $Co_3O_4$, 30 to 43 weight percent of $Ni_2O_3$, and 0 to 5 weight percent of the additive. The additive includes ferroferric oxide ($Fe_3O_4$), titanium dioxide ($TiO_2$), zinc oxide (ZnO), and/or cupric oxide (CuO).

Next, as shown in block 130, the above NTC thermistor mixture, a mixture of 95% toluene and 5% alcohol, and oleic acid are mixed and milled at a speed of 200 to 600 rpm for 4 to 8 hours. The above NTC thermistor mixture is ball milled and dispersed (wet ball mill) to obtain a ball-milled mixture. Based on a total weight of the ball-milled mixture as 100 weight percent, the ball-milled mixture includes 40 to 60 weight percent of the NTC thermistor mixture, 39.5 to 55 weight percent of the mixture of 95% toluene and 5% alcohol, and 0.5 to 5 weight percent of oleic acid. In some embodiments, a drying temperature of the ball-milled mixture is 100° C.

Next, the above ball-milled mixture is sintered to obtain an NTC thermistor sintered material (also called a thermistor sintered material), as shown in block 140. In some embodiments, the sintering conditions are to raise the temperature to 1000° C. to 1500° C. within 2 to 5 hours, maintain the temperature for 1 to 3 hours, and then cool naturally to obtain the NTC thermistor sintered material. The sintering can be performed, for example, in an atmospheric environment.

After the block 140 is performed, the above NTC thermistor sintered material, terpineol, and oleamide are mixed to obtain an NTC thermistor sintered material mixture (also called a thermistor sintered material mixture), as shown in block 150. A horizontal ball miller is thereafter used to mill at a speed of 800 to 1200 rpm for 3 to 5 hours to ball mill and pulp the NTC thermistor sintered material mixture so as to obtain an NTC thermistor semi-finished product slurry (also called a thermistor semi-finished product slurry). Based on a total weight of the NTC thermistor sintered material mixture as 100 weight percent, the NTC thermistor sintered material mixture includes 40 to 60 weight percent of the thermistor sintered material, 40 to 55 weight percent of terpineol, and 0.5 to 5 weight percent of oleamide.

In some embodiments, the operation of ball milling and pulping includes adding zirconia beads, silicon carbide (SiC), silicon dioxide ($SiO_2$), or aluminum oxide ($Al_2O_3$). In some embodiments, a diameter of each of the zirconia beads is 0.5 mm. In some embodiments, an average particle size D50 of the NTC thermistor semi-finished product slurry is from 0.3 μm to 0.9 μm.

After the above NTC thermistor semi-finished product slurry is obtained, the NTC thermistor semi-finished product slurry, the glass powder, and the organic carrier are mixed to obtain an NTC thermistor semi-finished product slurry mixture (also called a thermistor semi-finished product slurry mixture). The organic carrier includes an organic solvent, a binder, and an additive. Based on a total weight of the NTC thermistor semi-finished product slurry mixture as 100 weight percent, the NTC thermistor semi-finished product slurry mixture includes 40 to 70 weight percent of the NTC thermistor semi-finished product slurry, 1 to 5 weight percent of the glass powder, 10 to 40 weight percent of the organic solvent, 5 to 15 weight percent of the binder, and 0.5 to 5 weight percent of the additive. It should be noted that all of the above glass powder, organic solvent, binder, and additive in the NTC thermistor semi-finished product slurry mixture can be added to the NTC thermistor semi-finished product slurry at once or in batches.

The addition of the glass powder can reduce a sintering temperature of subsequent sintering, which is advantageous to reducing the production cost. In some embodiments, the NTC thermistor semi-finished product slurry mixture is stirred and mixed by using a planetary mixer.

After the NTC thermistor semi-finished product slurry mixture is obtained, three rollers are used to roll the NTC thermistor semi-finished product slurry mixture. Next, the NTC thermistor semi-finished product slurry mixture is filtered to obtain an NTC thermistor paste (also called the thermistor paste) of the present invention. In some embodiments, after filtering the above NTC thermistor semi-finished product slurry mixture through a 150 mesh sieve, an average grinding fineness of the obtained thermistor paste is smaller than 20 μm. In some embodiments, a sintering temperature of the NTC thermistor paste is from 650° C. to 1100° C., such as below 850° C. In some embodiments, the NTC thermistor paste can be co-fired with a silver paste in an atmosphere of 850° C.

The present invention provides the NTC thermistor paste. Based on a total weight of the NTC thermistor paste as 100 weight percent, the NTC thermistor paste includes 50 to 89 weight percent of a NTC thermistor powder (also called a thermistor powder), 1 to 5 weight percent of the glass powder, and 10 to 45 weight percent of the organic solvent. A main component of the NTC thermistor powder is $Mn_xCo_{1-x}Ni_yO_{1.6}$, wherein x is from 0.4 to 1.0 and y is from 0.07 to 0.75. The NTC thermistor powder further includes trace amount(s) of metal oxide(s), such as an iron oxide, a zinc oxide, a titanium oxide, a copper oxide and/or some other metal oxide.

If the content of the NTC thermistor powder was less than 50 weight percent, the electrical properties (such as a resistance value, a reactivity to temperature) of the resulted thermistor element would not meet expectations. If the content of the NTC thermistor powder was greater than 89 weight percent, it would be difficult to increase the viscosity of the paste due to the excessive solid powder, which would be disadvantageous to the subsequent processing. If the content of the glass powder was less than 1 weight percent, the bonding degree between the resulted thermistor paste and the substrate would be poor, thereby making the subsequent processing tend to peel easily. If the content of the glass powder was greater than 5 weight percent, the electrical properties (such as the resistance value, the reactivity to temperature) of the resulted thermistor element would not meet expectations. If the content of the organic carrier was less than 10 weight percent, it would be difficult to increase the viscosity of the paste due to the excessive solid powder, which would be disadvantageous to the subsequent processing. If the content of the organic carrier was greater than 45 weight percent, it would be difficult to control the rheological properties of the thermistor paste, which would be disadvantageous to the subsequent processing.

In some embodiments, based on a total weight of the glass powder as 100 weight percent, the glass powder includes 20 to 50 weight percent of bismuth trioxide ($Bi_2O_3$), 10 to 30 weight percent of silicon dioxide ($SiO_2$), 5 to 30 weight percent of boron oxide ($B_2O_3$), 5 to 10 weight percent of titanium dioxide ($TiO_2$), 5 to 20 weight percent of aluminum oxide ($Al_2O_3$), 5 to 20 weight percent of zinc oxide (ZnO), and 5 to 20 weight percent of vanadium pentoxide ($V_2O_5$).

Based on a total weight of the organic carrier as 100 weight percent, the organic carrier includes 80 to 92 weight percent of the organic solvent, 5 to 15 weight percent of the binder, and 3 to 5 weight percent of the additive.

If the content of the organic solvent was less than 80 weight percent, the wettability of the organic solvent to the solid powder would be insufficient, or the organic branch chains in the binder or additive could not be smoothly moistened, and both of which would result in insufficient dispersion stability of the paste. If the content of the organic solvent was greater than 92 weight percent, the solid powder of the paste would not be completely dispersed or coated, thus would result in poor dispersibility of the paste. If the content of the binder was less than 5 weight percent, the viscosity of the paste would be insufficient, which would be disadvantageous to the subsequent processing. If the content of the binder was greater than 15 weight percent, the viscosity of the paste would be excessively high, which would be also disadvantageous to the subsequent processing. If the content of the additive was less than 3 weight percent, some abnormalities or difficulties would be caused during processing of the paste, such as poor storage dispersibility, bubbles would be generated during processing, or the inability to print or coat smoothly on the substrate, etc. If the content of the additive was greater than 5 weight percent, the organic branch chains in the additive were easily entangled with each other, and the viscosity of the paste would be too thick to subsequent processing.

In some embodiments, the organic solvent includes an ester solvent, an alcohol solvent, an aromatic hydrocarbon solvent, and/or a petroleum hydrocarbon. In some embodiments, the organic solvent is selected from the group consisting of ethylene glycol monoethyl ether acetate, ethylene glycol monobutyl ether acetate, hexanol, terpineol, benzyl alcohol, and petroleum hydrocarbon. In some embodiments, the organic solvent excludes methanol and ethanol. Since the NTC thermistor paste of the present disclosure excludes methanol and ethanol, it is advantageous to long-term storage and it does not tend to have problems such as deterioration or precipitation, etc.

In some embodiments, the binder is selected from the group consisting of ethyl cellulose, methyl cellulose, rosin resin, polymethacrylamide, and polyvinyl butyral. In some embodiments, a viscosity of the NTC thermistor paste is from 5 Pa·s to 300 Pa·s, for example, from 50 Pa·s to 280 Pa·s.

In some embodiments, the additive includes a dispersant and/or a levelling agent. In some embodiments, the additive is selected from the group consisting of lecithin, oleic acid, stearic acid, fatty acid, erucamide, oleamide, stearamide, polyacrylamide, and N, N-ethylene bis-stearamide. The addition of the additive helps increase the storage stability of NTC thermistor paste, reduce the surface tension of NTC thermistor paste, and increase the dispersion of NTC thermistor paste.

In some embodiments, a temperature coefficient of resistance of the NTC thermistor paste is from 3900 ppm/° C. to 4600 ppm/° C., such as 4000 ppm/° C., 4200 ppm/° C., 4400 ppm/° C. In some embodiments, a resistivity of the NTC thermistor paste is less than 400 m, such as 1Ω·m, 10Ω·m, 20Ω·m, 25Ω·m, 30Ω·m, or 35Ω·m. In some embodiments, the NTC thermistor paste can be applied to a screen printing process, a stencil printing process, or a printing coating process.

The present invention provides a thermistor paste and a manufacturing method thereof. The thermistor paste of the present invention is obtained by mixing the thermistor semi-finished product slurry and the glass powder and the organic carrier. The thermistor semi-finished product slurry has been sintered, so it has relatively uniform electrical properties and better electrical stability. The thermistor paste of the present invention excludes a precious metal, such as ruthenium, gold, or platinum, etc., so the production cost can be reduced. Additionally, the thermistor paste of the present invention can be applied by utilizing thick film printing to quickly produce thermistor chips.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure covers modifications and variations of this disclosure provided they fall within the scope of the following claims and their equivalents.

What is claimed is:

1. A thermistor paste, based on a total weight of the thermistor paste as 100 weight percent, comprising:
   50 to 89 weight percent of a thermistor powder, wherein a main component of the thermistor powder is $Mn_xCo_{1-x}Ni_yO_{1.6}$, x is from 0.4 to 1.0, and y is from 0.07 to 0.75;
   1 to 5 weight percent of a glass powder; and
   10 to 45 weight percent of an organic carrier, wherein based on a total weight of the organic carrier as 100 weight percent, the organic carrier comprises:
   80 to 92 weight percent of an organic solvent;
   5 to 15 weight percent of a binder; and
   3 to 5 weight percent of an additive;
   wherein an average grinding fineness of the thermistor paste is smaller than 20 μm.

2. The thermistor paste of claim 1, wherein based on a total weight of the glass powder as 100 weight percent, the glass powder comprises:
   20 to 50 weight percent of bismuth trioxide ($Bi_2O_3$);
   10 to 30 weight percent of silicon dioxide ($SiO_2$);
   5 to 30 weight percent of boron oxide ($B_2O_3$);
   5 to 10 weight percent of titanium dioxide ($TiO_2$);
   5 to 20 weight percent of aluminum oxide ($Al_2O_3$);
   5 to 20 weight percent of zinc oxide (ZnO); and
   5 to 20 weight percent of vanadium pentoxide ($V_2O_5$).

3. The thermistor paste of claim 1, wherein the organic solvent is selected from the group consisting of ethylene glycol monoethyl ether acetate, ethylene glycol monobutyl ether acetate, hexanol, terpineol, benzyl alcohol, and petroleum hydrocarbon.

4. The thermistor paste of claim 1, wherein the organic solvent excludes methanol and ethanol.

5. The thermistor paste of claim 1, wherein the binder is selected from the group consisting of ethyl cellulose, methyl cellulose, rosin resin, polymethacrylamide, and polyvinyl butyral.

6. The thermistor paste of claim 1, wherein the additive is selected from the group consisting of lecithin, oleic acid, stearic acid, fatty acid, erucamide, oleamide, stearamide, polyacrylamide, and N,N-ethylene bis-stearamide.

7. The thermistor paste of claim 1, wherein the additive comprises a dispersant and/or a levelling agent.

8. The thermistor paste of claim 1, wherein a viscosity of the thermistor paste is from 5 Pas to 300 Pa·s.

9. The thermistor paste of claim 8, wherein the viscosity of the thermistor paste is from 50 Pas to 280 Pa·s.

* * * * *